3,652,541
ETHERIFIED DEPOLYMERIZED STARCH PRODUCT COMPATIBLE WITH POLYVINYL ALCOHOL
Erling T. Hjermstad and Leonard J. Coughlin, Cedar Rapids, Iowa, assignors to Penick & Ford Limited, Cedar Rapids, Iowa
No Drawing. Filed Jan. 26, 1970, Ser. No. 5,971
Int. Cl. C08b 19/06
U.S. Cl. 260—233.3 R        7 Claims

ABSTRACT OF THE DISCLOSURE

An etherified depolymerized starch product exhibiting compatibility with aqueous polyvinyl alcohol solutions useful for size or adhesive application, said starch product consisting essentially of starch containing acid salt radicals selected from —$SO_3X$, or $SO_3X$ and —COOX, wherein X is a cation selected from $Na^+$, $K^+$, or $NH_4^+$, in the amount of .45 to 4.5% by weight based on said product of —$SO_3Na$, or molar equivalents of —$SO_3K$, —$SO_3NH_4$, —COONa, —COOK, or —$COONH_4$, said —$SO_3X$ radical being present in ether-linked groups containing from 2 to 3 carbons, said mixture containing at least .15% —$SO_3Na$ radicals, or molar equivalents of —$SO_3K$ or —$SO_3NH_4$, said —COOX radicals being present as starch—O—COOX said starch product being further characterized by an alkali fluidity of less than 95 and above 5 and by being substantially free of inorganic salts.

BACKGROUND

Starch has been used with polyvinyl alcohol (PVA) for a number of years, particularly in adhesives and textile sizes. The incorporation of PVA improves bonding strength, film strength and flexibility, grease and oil resistance, water resistance, etc. Generally, the more highly hydrolyzed grades of PVA are used with starch in proportions up to 1 part of PVA to 3 parts of starch.

While PVA has been used commercially with starch for adhesives and textile sizes, there has been very little success in developing mixtures of PVA and starch which give the desired improvement and are economically feasible. PVA is a relatively high cost material and it is necessary to use an extender, such as starch, dextrin, casein, clay, calcium carbonate, etc., to lower costs. Starch would appear to be an ideal extender because of its extremely low relative cost and its ability to form fairly strong and flexible grease and oil resistant films. However, attempts to formulate PVA-starch mixtures with sufficient PVA to attain worthwhile improvement in sized paper have been unsuccessful due to the tendency of starch and PVA to separate into a 2-phase system when proportions of starch and PVA greater than about 10% of either one with the other are dispersed in water. It would be desirable to use 10 or 15% up to 50 or 60%, PVA in the PVA-starch mixture to obtain worthwhile improvement in paper sizes. Another effect higher ratios of PVA to starch during paper sizing have is the rejection of one component when the sized paper is passed through the rolls of a size press, thus changing the ratio in the remaining size and causing a deterioration in sized sheet properties on continued operation. For these reasons, there has been very little commercial use of PVA-starch mixtures for paper sizing, especially at paper size viscosity and concentration levels.

A great number of starch varieties, starch modifications, starch derivatives, and dextrins have been evaluated with PVA in attempts to overcome these deficiencies and develop formulations which will give satisfactory performance at economically feasible proportions of components. Ordinary commercial starches such as unmodified starch, acid-thinned starch, or dextrins made from the common varieties of starch gave very poor performance. Oxidized starches and hydroxyethylated starches gave improved performance (Elvanol Brochure du Pont Co., 1967, p. 15) but negligible commercial success has resulted. The use of esterified or etherified starches containing carboxyl radicals was suggested in 1957 in U.S. Pat. 2,808,380. These show some improvement as do oxidized starches which also contain carboxyl groups. However, neither oxidized starches nor derivatized starch with carboxyl radicals have been sufficiently suitable to result in commercial development of economically feasible, improved performance starch-PVA paper sizes. There has, therefore, been a definite need for a starch product which can be used with PVA in proportions up to 50% or more of each without phase separation and rejection of components during size press operation.

SUMMARY

This invention is based on the discovery that the compatibility of starch with polyvinyl alcohol depends on a number of complex and interrelated factors, including the degree of salt acid radical substitution by etherification and/or oxidation, the extent of depolymerization, and the freedom of the product from inorganic salts. The starch should contain —$SO_3X$ radicals, or both —$SO_3X$ and —COOX radicals (X=Na, K, or $NH_4$). Using —$SO_3Na$ as the base, the starch should contain from .45 to 4.5% by weight of the salt acid radicals (or molar equivalents of —$SO_3K$, —$SO_3NH_4$, —COONa, —COOK, or —$COONH_4$). The starch should contain at least .15 to .20% —$SO_3X$ based on —$SO_3Na$, contained in ether-linked substituent groups having from 2 to 3 carbons.

The extent of depolymerization, as determined by alkali fluidity, should be such that the starch product has an alkali fluidity of less than 95 and above 5. In addition, it is desirable that the product is substantially free of inorganic salts, such as sodium chloride or sodium sulfate, which are frequently present in high concentrations during the etherification of starch.

The invention in its preferred embodiments includes other important discoveries. While the starch product can be thinned or depolymerized by acids or enzymes, hypochlorite oxidation is preferred. It has been found that such oxidation not only thins are etherified starch to the necessary fluidity, but also, under alkaline conditions, introduces additional salt acid groups, as starch, —COOX groups (X=Na, K, or $NH_4$).

The preferred substitution and alkali fluidity ranges, substituent groups, salt content, and other criteria, will be described in the following detailed specification. It will be understood that these form part of the present invention, and provide the means for maximizing the advantages of the invention.

DETAILED SPECIFICATION

The starting material for the present invention can be any granule starch, such as the starches derived from corn, potatoes, waxy maize, tapioca, etc. These starches in their original unmodified state are obtained in granular form, being cold water insoluble, and being subject to gelatinization on heating in water. As is well known in the art, the granule structure of starch persists even during such modification treatments as etherification, acid-conversion to thin-boiling types of starch, and hypochlorite oxidation. The term "starch" is therefore used in its broad or generic sense in this application as referring to any of the known varieties of starch.

In the practice of the present invention, the granule starch is etherified with sulfoalkylating agents to introduce ether groups containing sulfonate radicals. The desired products can be represented as:

$$\text{Starch—O—R—SO}_3\text{X}$$

where R is an alkyl group containing from 2 to 3 carbons, such as ethyl, propyl, or hydroxyl propyl, and X is an alkali metal, such as sodium or potassium, or ammonium.

Suitable reagents which combined with starch to introduce alkyl groups having alkali metal sulfonate radicals are monochloro alkyl sulfonates, such as 2 chloroethanesulfonate or 3 chloro-2 hydroxypropane sulfonate, and sultones, such as propane sultone. These react with starch as illustrated by the following equations in which the starch radical is designated as R.

(1) R—OH+ClCH$_2$CH$_2$—SO$_3$Na+NaOH→
    R—O—CH$_2$CH$_2$—SO$_3$Na+NaCl+H$_2$O (see U.S. Pat. 2,883,375; U.S. Pat. 2,802,000)

(2) R—OH+Cl—CH$_2$—CHOHCH$_2$—SO$_3$Na
    +NaOH→R—O—CH$_2$CHOHCH$_2$SO$_3$Na+NaCl+H$_2$O
(see U.S. Pat. 2,825,727; U.S. Pat. 2,806,857)

(3)
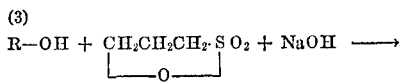

R—O—CH$_2$CH$_2$CH$_2$SO$_3$Na + H$_2$O (see U.S. Pat. 3,046,272)

Another method of preparing alkyl ethers of starch containing sodium sulfonate groups is to first introduce allyl or methallyl ether groups and then treat with an excess of sodium bisulfite. The sodium bisulfite presumably adds to the double bond of the allyl starch in a manner similar to its addition to double bonds which are conjugated with carbonyl groups. The reaction is illustrated by the following equation in which the starch radical is designated as R.

(1) R—OH+ClCH$_2$CH=CH$_2$+NaOH→
    R—O—CH$_2$CH=CH$_2$+NaCl+H$_2$O (see U.S. Pat. 3,062,810)

(2) R—O—CH$_2$—CH=CH$_2$+NaHSO$_3$→
    R—O—(CH$_2$)$_3$SO$_3$Na

Patent literature citations relating to the foregoing reaction procedures are set out above, and see also "Starch Chemistry and Technology" by Whistler and Paschall Academic Press, Inc., New York, N.Y., vol. II, 1967, p. 320.

The etherification to introduce the —SO$_3$X groups should be continued until the starch contains at least .15%, or preferably not less than .20% by weight —SO$_3$Na or molar equivalents of —SO$_3$K or —SO$_3$NH$_4$. In one particularly advantageous embodiment the starch is etherified to a substitution level of .6 to 3% by weight of —SO$_3$Na, or molar equivalents of —SO$_3$K or —SO$_3$NH$_4$; and the starch is also oxidized to introduce starch

—COOX groups in an amount of .3 to 1.5% by weight based on —COONa, or molar equivalents of —COOK or

—COONH$_4$

The etherified starch is subjected to depolymerization. Depolymerization of the etherified starch product is essential to obtain products which do not show phase separation when dispersed in water with high proportions of PVA at low viscosity levels. The depolymerization can be done by acids, for example, HCl or H$_2$SO$_4$, and the thinned product neutralized and washed free of salts on a filter or centrifugal equipment. The acid depolymerization is conducted in water suspensions at temperatures below the swelling temperature of the etherified product. Sufficient acid to lower the pH to around 1.0 is added. Lower pH will give a faster rate of acid depolymerization.

Oxidizing agents can be used to depolymerize the etherified starch. These have the advantage of increasing the acid groups in the starch polymer structure while at the same time thinning or depolymerizing to a low viscosity level. Suitable oxidizing agents are hypochlorites, such as sodium hypochlorite, persulfates, such as ammonium or alkali metal persulfates, and peroxides, such as hydrogen peroxide or sodium peroxide. Sodium hypochlorite is the preferred oxidizing agent and under alkaline conditions it is an effective thinner and contributes additional sodium carboxy groups. The proportion of oxidizing agent used can vary widely, depending upon the reaction conditions, particularly, the pH of the starch suspension. Sodium hypochlorite used in a proportion range of from 1% to 6% available chlorine based on starch solids, results in sufficient depolymerization. The use of from 2% to 5% available chlorine based on starch solids is preferred. Enzymes, for example alpha amylase, can be used to depolymerize the etherified product in the gelatinized state. Very low proportions of these enzymes, such as .05 to .25% based on starch solids, are effective.

Following etherification and depolymerization, the starch is filtered, and washed to a low salt content. As indicated above, the starch product should be substantially free of inorganic salts. In general, the water-soluble salt content should be less than 1.5% by weight, and preferably less than or at least not over 1.0% by weight. The optimum range is about 0.1 to 0.5%.

The degree of polymerization can be specified in terms of the alkali fluidity of the depolymerized product. This viscosity measurement is commonly used to characterize thin-boiling and oxidized starches in the corn wet-milling industry.

Alkali fluidities ranging from 5 to 90 are suitable in the present process. Fluidities of from 30 to 90 are preferred. While it is convenient to first etherify the starch and then depolymerize it, the reserve sequence can also be used in certain cases.

Since the foregoing depolymerization processes are well-known in the art, it will not be necessary to describe them further herein. The oxidation of starch with alkaline hypochlorite is described in standard treatises such as Chemistry and Industry of Starch, Kerr, Academic Press, Inc. (2nd 1950). In addition to the depolymerization, it is generally accepted that —COOX groups are introduced into the starch. These —COOX groups are formed from the carbon atoms of the glucose unit and oxidized starch is designated in this specification as starch—COOX. Alkali metal or ammonium sulfoalkyl ethers of starch are herein designated as starch—O—$(CH_2)_nSO_3X$. ($n=2$ or 3, and one H can be replaced by OH). In a preferred embodiment of the present invention, the etherified depolymerized starch product contains a mixture of starch—O—$CH_2CH_2CH_2SO_3X$ and starch—COOX, where X is preferably Na.

It will be understood that whatever method of depolymerization is employed, the resulting product will have an alkali fluidity within the ranges stated above. As used herein, the term "alkali fluidity" refers to the standard starch test, as described for instance, in Chemistry and Industry of Starch, Kerr, pages 133–134, (2nd ed. 1950, Academic Press, Inc. N.Y.).

Etherified depolymerized starch products produced as described above can advantageously be employed in combination with polyvinyl alcohols of the kind which have heretofore been used as sizes or adhesives. In the industry, such polyvinyl alcohols are usually specified in terms of degree of polymerization (unit average molecular weight based on $CH_2CHOH$ monomer) and degree of hydrolysis (mole percent). In general, suitable polyvinyl alcohols have a degree of polymerization ranging from about 300 to 1900, and a degree of hydrolysis greater than 88%, preferably greater than 98%. For use as sizes, the preference is for substantially completely hydrolyzed products (98.8–100% hydrolyzed). Depending on the use to be made of the PVA, the molecular weight can be varied. For paper size applications, a preferred degree of polymerization is from about 300 to 1400, and especially advantageous are PVA's of 1000–1400. Polyvinyl alcohols of this character are available as dry powders, being sold for example, by E. I. du Pont de Nemours & Co., Wilmington, Del. under the trademark, "Elvanol." Suitable products are Elvanol 72–60, Elvanol 71–30 and Elvanol 70–05.

According to the present invention, it is preferred to employ at least 10 parts by weight of polyvinyl alcohol per 90 parts of the modified starch. The compatibility of modified starch as prepared in accordance with the present invention permits much higher proportions of polyvinyl alcohol, up to 60 parts of PVA per 40 parts of modified starch. For use as a paper size, the preferred range is about 15 parts by weight of polyvinyl alcohol per 85 parts of modified starch up to 50 parts of PVA per 50 parts of the modified starch. The granule starch and PVA powder can be dry blended in suitable mixing equipment to produce a dry mixture which can then be used to form stable size or adhesive compositions. The mixture, or the separate ingredients, can be heated in water at a temperature and for a time sufficient to gelatinize the starch and dissolve the PVA. Usually, heating at about 190–200° F. for 30 minutes will be sufficient to complete the formulation. It will be understood that the water serves as a carrier, and that the amount of water will be adjusted to produce a complete formulation of the desired viscosity. For use as a paper size, formulations having a Dudley viscosity of about 40–60 seconds at 150° F. are preferable. The Dudley viscosity is a standard test in the art, being described, for example, in Chemistry and Industry of Starch, Kerr, pages 121–122 (2nd ed. 1950, Academic Press, Inc., N.Y.).

This invention is further illustrated by the following specific examples. Unless otherwise designated, the polyvinyl alcohol (or PVA) referred to in the examples is a fully hydrolyzed (98.8% or higher) polyvinyl alcohol having a degree of polymerization ranging from 300 to 1400, such as du Pont's Elvanol No. 71–30 (99–100% hydrolyzed; 1200 unit average molecular weight).

EXAMPLE 1

Unmodified starches of different varieties were reacted in alkaline suspensions containing sodium chloride as a swelling inhibitor with varying proportions of reagents to attach sodium sulfonate groups to the starch polymer chains by etherification. To 40% dry substance starch suspensions were added a mixture of 30% sodium hydroxide and 26% sodium chloride containing 1.5 parts of NaOH per 100 parts by weight of starch solids and 6–10 parts by weight of NaCl per 100 parts by weight of water in the starch suspension. Proportions of propane sultone ranging from 0.01–0.07 mole per glucose unit of starch were added to introduce sodium sulfopropyl ether groups and the suspension agitated for 17–42 hours at 100° F. The suspensions were then neutralized to pH 7.0, dewatered on a filter, washed free of salts and dried.

These products and other types of starch were then cooked with polyvinyl alcohol (99% hydrolyzed) in a 1:1 ratio at around 15% solids concentration at 90° F. for 30 minutes and the viscosity of the dispersions adjusted to Dudley Pipette viscosities of 40–50 seconds by dilution. The dispersions were allowed to stand for 24–48 hours to determine phase separation. The results are tabulated below in Table A.

TABLE A.—UNDEPOLYMERIZED SODIUM SULFOPROPYL STARCH

| Base starch | Maximum theoretical —$SO_3Na$ content, percent | Phase separation [1] |
| --- | --- | --- |
| Corn | 0.64 | Moderate. |
| Do | 0.84 | Do. |
| Do | 1.68 | Very slight. |
| Do | 2.52 | None. |
| Do | 3.20 | Do. |
| Do | 4.40 | Do. |
| Do | None | Severe. |

[1] On standing 24–48 hours 1:1 starch to PVA dispersion (Dudley visc. 40–50 sec. at 150° F.)

The above data show that increasing sulfopropyl content in starch results in increasing dispersion stability when cooked with polyvinyl alcohol. The starches reacted with the higher proportions of propane sultone showed very good dispersion stability with PVA.

EXAMPLE II

Unmodified starch was reacted with proportions of propane sultone ranging from 0.01–0.07 mole per glucose unit under the conditions described in Example I. The pH of the suspensions was then lowered to 7.0 and sufficient sodium hypochlorite solution, analyzing around 6–7% available chlorine and 2% NaOH, to depolymerize the starches to 80–90 alkali fluidity was added and the suspensions agitated at 95° F. for 18–24 hours. Proportions of available chlorine based on starch solids ranged from 4 to 5%. Some of the propane sultone reacted suspensions were acidified to pH 0.8 with HCl and acid-converted to 80–90 alkali fluidity instead of converting with sodium hypochlorite.

The suspensions were neutralized to pH 7–9, dewatered on a filter, washed free of salts and dried. These products and other types of starch were cooked with PVA as in Example I and allowed to stand 24–48 hours to determine phase separation. The results are tabulated below in Table B.

TABLE B.—DEPOLYMERIZED SODIUM SULFOPROPYL STARCH—80–90 ALKALI FLUIDITY

| Base starch | Maximum theoretical—$SO_3Na$ content, percent | Acid or hypochlorite converted | Phase separation [1] |
| --- | --- | --- | --- |
| Corn | None | Acid | Severe. |
| Do | None | Na hypochlorite | Do. |
| Do | 0.64 | do | None. |
| Do | 0.64 | Acid | Severe. |
| Do | 1.68 | Na hypochlorite | None. |
| Do | 1.68 | Acid | Moderate. |
| Do | 4.4 | Na hypochlorite | None. |
| Do | 4.4 | Acid | Do. |

[1] On standing 24–48 hours 1:1 starch to PVA dispersion (Dudley visc. 40–50 sec. at 150° F.)

The above data show that good dispersion stability is obtained with hypochlorite converted starches having high and low sodium sulfonate contents even though regular hypochlorite converted starches do not. The presence of sodium sulfonate groups also improved the PVA dispersion stability of acid converted starch, although somewhat higher contents are required.

EXAMPLE III

Unmodified starch was reacted with proportions of allyl chloride ranging from 0.01 to 0.10 mole per glucose unit in alkaline suspensions containing sodium chloride as a swelling inhibitor. To 40% dry substance starch suspensions was added a mixture of 30% sodium hydroxide and 26% sodium chloride containing from 2 to 3 parts of NaOH per 100 parts of starch solids and 8 parts of NaCl per 100 parts of water in the suspension. Allyl chloride was added and the suspensions were agitated in a closed vessel at 115° F. for around 70 hours. The suspensions were then neutralized to pH 7.0 with HCl and sodium bisulfite added in proportions of 3 moles of $NaHSO_3$ per mole of allyl chloride which had been added. The suspensions were then agitated for 24 hours, the pH readjusted to 7.0, and the starch product purified by dewatering on a filter and washing free of salts and residual sodium bisulfite. The purified products were resuspended in water in 40% solids concentrations and sufficient sodium hypochlorite solution, containing 6–7% available chlorine and 2% NaOH, to convert the starch to 80–90 alkali fluidity was added and the suspensions agitated for 18–24 hours at 95° F. Proportions of available chlorine based on starch solids ranged from 4 to 5%.

The suspensions were neutralized to pH 7.0 and the starch dewatered on a filter and washed free of salts. The starches were cooked with PVA as in Example 1 and allowed to stand 24–48 hours to determine phase separation. The results are tabulated below in Table C.

TABLE C.—DEPOLYMERIZED $NaHSO_3$ TREATED ALLYL STARCH—80-90 ALKALI FLUIDITY

| Base starch | Maximum theoretical —$SO_3Na$ content, percent | Depolymerizing agent | Phase separation [1] |
|---|---|---|---|
| Corn | None | Na hypochlorite | Severe. |
| Do | 0.64 | do | Do. |
| Do | 1.35 | do | Very slight. |
| Do | 2.70 | do | Do. |
| Do | 3.20 | do | None. |
| Do | 6.40 | do | Do. |

[1] On standing 24–48 hours 1:1 starch to PVA dispersion (Dudley visc. 40–50 sec. at 150° F.)

The above data show that good starch-PVA dispersion stability is obtained with sodium propyl sulfonate starches which are prepared with allyl chloride and $NaHSO_3$ and then depolymerized with sodium hypochlorite solution.

EXAMPLE IV

Unmodified corn starch was reacted with .05 mole of propane sultone per glucose unit of the starch by the method described in Example 1. The neutralized, purified, and undepolymerized sodium sulfopropyl starch product was slurried in water with PVA (99% hydrolyzed) in a 1:1 ratio at 15% total solids concentration. Two-tenths percent of calcium acetate based on starch was added, the slurry adjusted to pH 7.0, and 0.05% of a bacterial alpha amylase enzyme concentrate (Amyliq, Wallerstein Co.) was added. The slurry was heated to 170° F. and held at this temperature level for 30 minutes. The dispersion was adjusted to a Dudley Pipette viscosity of 40–50 seconds and allowed to stand for 48 hours. No phase separation occurred.

EXAMPLE V

Sodium sulfopropyl starches such as those described in Examples I, II, III, and IV dispersed with PVA in proportions of 3 parts starch to 1 part PVA and 1 part starch to 1 part PVA and applied to paper result in improved grease and oil resistance, printability, wet-rub resistance, and porosity value as compared with paper sized with starches or starch derivatives without PVA.

What is claimed is:

1. An etherified depolymerized starch product exhibiting compatibility with aqueous polyvinyl alcohol solutions useful for size or adhesive application, said starch product consisting essentially of starch containing acid salt radicals selected from the groups consisting of —$SO_3X$ and both —$SO_3X$ and —COOX, wherein X is a cation selected from the group consisting of $Na^+$, $K^+$, and $NH_4^+$, in the amount of .45 to 4.5% by weight based on said product of —$SO_3Na$, or molar equivalents of —$SO_3K$, —$SO_3NH_4$, —COONa, —COOK, or —$COONH_4$, said —$SO_3X$ radicals being bonded to said starch through alkyl groups containing from 2 to 3 carbons, said mixture containing at least .15% —$SO_3Na$ radicals, or molar equivalents of —$SO_3K$ or —$SO_3NH_4$, said —COOX radicals being present as starch —O—COOX, said starch product being further characterized by an alkali fluidity of less than 95 and above 5 and by being substantially free of inorganic salts.

2. The starch product of claim 1 wherein said starch contains both said —$SO_3X$ and —COOX radicals.

3. The starch product of claim 1 wherein said —$SO_3X$ radicals are —$SO_3Na$ and said —COOX radicals are —COONa.

4. The starch product of claim 2 wherein said —$SO_3X$ radicals are —$SO_3Na$ and said —COOX radicals are —COONa.

5. The starch product of claim 2 wherein said starch contains .6 to 3% by weight of said —$SO_3X$ radicals based on —$SO_3Na$, or molar equivalents of —$SO_3K$ or —$SO_3NH_4$, and .3 to 1.5% by weight of said —COOX radicals based on —COONa, or molar equivalents of —COOK or —$COONH_4$.

6. The starch product of claim 1 further characterized by an alkali fluidity of 30 to 90 and by water-soluble salt content of less than 1.5% by weight.

7. An etherified depolymerized starch product exhibiting compatibility with aqueous polyvinyl alcohol solutions useful for size or adhesive application, said starch product consisting essentially of starch containing both —$SO_3Na$ and —COONa radicals, said —$SO_3Na$ being present in an amount of .6 to 3% by weight and said —COONa radicals being present in an amount of .3 to 1.5% by weight, said —$SO_3Na$ being present as starch —O—$(CH_2)_xSO_3Na$ groups where x is an integer from 1 to 2, said —COONa being present as starch —COONa groups, said starch product being further characterized by an alkali fluidity of 30 to 90 and by water-soluble salt content of not over 1.0% by weight.

References Cited

UNITED STATES PATENTS

| 3,046,272 | 7/1962 | Strating et al. | 260—233.3 |
| 3,449,322 | 6/1969 | Elizer | 260—233.3 |

DONALD E. CZAJA, Primary Examiner

M. I. MARQUIS, Assistant Examiner

U.S. Cl. X.R.

117—156; 260—17.4 ST, 29.6 R, 233.3 A, 233.5